Nov. 14, 1967   W. H. SCIDMORE ETAL   3,352,620
WIDE ANGLE EYEPIECE WITH LARGE EYE RELIEF
Filed April 3, 1964
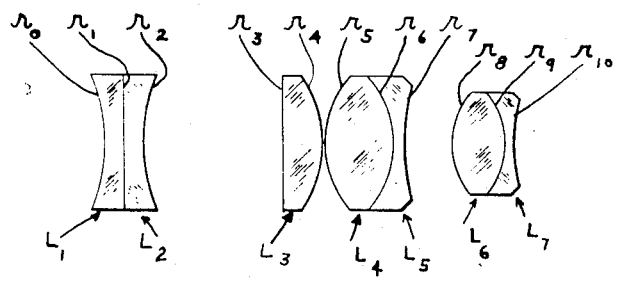
FIG. 1.
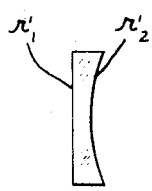    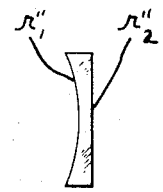
FIG. 2.                  FIG. 3.
*INVENTORS*
WRIGHT H. SCIDMORE
ROBERT J. WOLFE
BY Harry M. Saragovitz,
Edward Kelly, Herbert Berl &
S. Bubroff
ATTORNEYS:

United States Patent Office 3,352,620
Patented Nov. 14, 1967

3,352,620
WIDE ANGLE EYEPIECE WITH
LARGE EYE RELIEF
Wright H. Scidmore, Langhorne, and Robert J. Wolfe, Philadelphia, Pa., assignors to the United States of America as represented by the Secretary of the Army
Filed Apr. 3, 1964, Ser. No. 357,331
3 Claims. (Cl. 350—220)

ABSTRACT OF THE DISCLOSURE

A 4-component eyepiece consisting of a singlet reticle-lens, a singlet field lens, and a cemented doublet center and eye lens, the eyepiece being characterized by a large space between the field lens and reticle to accommodate longitudinal dioptral adjustment.

---

The invention described herein may be manufactured and used by or for the Government for governmental purposes without the payment to us of any royalty thereon.

This invention relates to precision eyepieces and more particularly to eyepieces having extraordinary dimensions for permitting relative movement of elements in, and associated with, the eyepiece.

Eyepieces are made with small front focal lengths to keep aberrations to a minimum and to allow for large eye relief.

We have succeeded in devising an eyepiece having a large front focal length concomitant with large eye relief without increasing aberrations. The large space thus provided between the field lens and the reticle permits the introduction of many advantageous innovations.

For example, it would be desirable to provide an eyepiece with a capability of storing a plurality of internal reticles which are adapted to be selectively oriented in the focal plane of the objective. A preferred method of accomplishing this result would be to mount the reticles on a rotating turret mechanism which can be controlled externally. For optimum results, clearance for this rotating turret mechanism must be provided by increasing the distance between the field lens and the reticle.

Because it is important to keep the reticle stationary with respect to the objective to avoid the introduction of errors, the reticle remains in the focal plane of the objective while eyepiece elements are moved longitudinally to achieve the desired dioptral adjustments.

It is an object of this invention to provide a large space between a field lens and a reticle in a wide angle eyepiece.

Another object is to achieve large eye relief without sacrificing a large front focal length in a wide angle eyepiece.

Still another object is to combine large eye relief with the large front focal length without increasing aberrations.

Other objects of the invention will become apparent to those skilled in the art to which the invention is directed when they read the disclosure, of which the following figures are a part:

FIG. 1 is an axial section of a wide angle eyepiece having a large space between the field lens and the reticle, and designed to provide an apparent field coverage of about 70 degrees, and FIGS. 2 and 3 are axial sections of alternate reticles which may be used in conjunction with the remaining elements of the eyepiece to achieve our new results.

As shown in FIG. 1, the preferred eyepiece comprises four axially aligned and air-spaced components consisting of seven lenses. The first component is composed of two identical plano-concave elements $L_1$ and $L_2$, cemented together to form an equi-concave component. This has a divergent effect upon the incident light, and its presence serves to increase the eye distance and reduce the Petzval sum. This negative doublet reticle lens has a focal length, $f_{1,2}$, of approximately $-2.722F$. The second component, a plano-convex singlet field lens, $L_3$, has a focal length, $f_3$, of approximately $2.385F$. The plano surface faces the reticle lens, $L_1$–$L_2$.

The third component is a cemented doublet center lens, $L_4$,–$L_5$, where $r_5$ equals $-.678r_6$, $r_5$ equals $.106r_7$, and $r_5$ equals $-r_4$ of the second component. The focal length, $f_{4,5}$ is approximately $2.969F$. The stronger convex surface faces the field lens. The fourth component is a cemented doublet eye lens, $L_6$,–$L_7$, where $r_8$ equals $-.878r_9$ and $r_8$ equals $.276r_{10}$, and has a focal length, $f_{6,7}$, of approximately $3.332F$.

The lenses of positive refracting power—$L_3$, $L_4$ and $L_6$ may be made from 620–603 glass while the two bi-concave negative lenses, $L_5$ and $L_7$, may be made from 720–293 glass. The reticle lens may be made from 584–460 glass.

FIGS. 2 and 3 show negative singlet reticle lenses having focal lengths of approximately $-2.722F$, either one of which could replace the reticle shown in FIG. 1. In any case, reticular markings are placed on the plano surface of the reticle.

The symbols in the figures and in the Lens Data Table to follow denote the following:

$L$=the individual lens
$r$=the radius of curvature
$d$=the thickness of lens
$l$=air space
$n$=refractive index
$\nu$=Abbes' number of the glass
$F$=total focal length
$f_{1,2}$=focal length of doublet, $L_1$–$L_2$
$f_3$=focal length of singlet, $L_3$
$f_{4,5}$=focal length of doublet, $L_4$–$L_5$
$f_{6,7}$=focal length of doublet, $L_6$–$L_7$
C.A.=clear aperture
A.P.=exit pupil

LENS DATA TABLE

| 1A | | | | $n_d$ | $\nu$ | C.A. |
|---|---|---|---|---|---|---|
| $L_1$-$L_2$ | $r_0 = -3.183$ | $d_0 = .080$ | | $n_0 = 1.5838$ | $\nu_0 = 46.0$ | C.A.$_0$ = 1.245 |
| | $r_1 = \pm\infty$ | $d_1 = .080$ | | $n_1 = 1.5838$ | $\nu_1 = 46.0$ | C.A.$_1$ = 1.245 |
| | $r_2 = +3.183$ | | | | | C.A.$_2$ = 1.245 |
| | | | $l_1 = .674$ | | | |
| $L_3$ | $r_3 = \pm\infty$ | $d_2 = .386$ | | $n_2 = 1.620$ | $\nu_2 = 60.3$ | C.A.$_3$ = 1.651 |
| | $r_4 = -1.481$ | | | | | C.A.$_4$ = 1.703 |
| | | | $l_2 = .008$ | | | |
| $L_4$-$L_5$ | $r_5 = +1.481$ | $d_3 = .560$ | | $n_3 = 1.620$ | $\nu_3 = 60.3$ | C.A.$_5$ = 1.641 |
| | $r_6 = -2.185$ | $d_4 = .101$ | | $n_4 = 1.720$ | $\nu_4 = 29.3$ | C.A.$_6$ = 1.546 |
| | $r_7 = +13.908$ | | | | | C.A.$_7$ = 1.424 |
| | | | $l_3 = .008$ | | | |
| $L_6$-$L_7$ | $r_8 = +1.260$ | $d_5 = .460$ | | $n_5 = 1.620$ | $\nu_5 = 60.3$ | C.A.$_8$ = 1.297 |
| | $r_9 = -1.435$ | $d_6 = .078$ | | $n_6 = 1.720$ | $\nu_6 = 29.3$ | C.A.$_9$ = 1.150 |
| | $r_{10} = +4.567$ | | | | | C.A.$_{10}$ = .978 |

LENS DATA TABLE

| B | | | | $n_d$ | $\nu$ | C.A. |
|---|---|---|---|---|---|---|
| $L_{1,2}'$ | $r_1' = \pm\infty$ | $d_1' = .089$ | | $n_1' = 1.5838$ | $\nu_1' = 46.0$ | C.A.$_1'$ = 1.245 |
| | $r_2' = +1.591$ | | | | | C.A.$_2'$ = 1.245 |
| | | | $l_1' = .670$ | | | |
| $L_3'$ | $r_3' = \pm\infty$ | $d_2' = .386$ | | $n_2' = 1.620$ | $\nu_2' = 60.3$ | C.A.$_3'$ = 1.651 |
| | $r_4' = -1.481$ | | | | | C.A.$_4'$ = 1.703 |
| | | | $l_2' = .008$ | | | |
| $L_4'$-$L_5'$ | $r_5' = +1.481$ | $d_3' = .560$ | | $n_3' = 1.620$ | $\nu_3' = 60.3$ | C.A.$_5'$ = 1.641 |
| | $r_6' = -2.185$ | $d_4' = .101$ | | $n_4' = 1.720$ | $\nu_4' = 29.3$ | C.A.$_6'$ = 1.546 |
| | $r_7' = +13.908$ | | | | | C.A.$_7'$ = 1.424 |
| | | | $l_3' = .008$ | | | |
| $L_6'$-$L_7'$ | $r_8' = +1.260$ | $d_5' = .460$ | | $n_5' = 1.620$ | $\nu_5' = 60.3$ | C.A.$_8'$ = 1.297 |
| | $r_9' = -1.435$ | $d_6' = .078$ | | $n_6' = 1.720$ | $\nu_6' = 29.3$ | C.A.$_9'$ = 1.150 |
| | $r_{10}' = +4.567$ | | | | | C.A.$_{10}'$ = .978 |

LENS DATA TABLE

| C | | | | $n_d$ | $\nu$ | C.A. |
|---|---|---|---|---|---|---|
| $L_{1,2}''$ | $r_1'' = -1.591$ | $d_1'' = .089$ | | $n_1'' = 1.5838$ | $\nu_1'' = 46.0$ | C.A.$_1''$ = 1.245 |
| | $r_2'' = \pm\infty$ | | | | | C.A.$_2''$ = 1.245 |
| | | | $l_1'' = .725$ | | | |
| $L_3''$ | $r_3'' = \pm\infty$ | $d_2'' = .386$ | | $n_2'' = 1.620$ | $\nu_2'' = 60.3$ | C.A.$_3''$ = 1.651 |
| | $r_4'' = -1.481$ | | | | | C.A.$_4''$ = 1.703 |
| | | | $l_2'' = .008$ | | | |
| $L_4''$-$L_5''$ | $r_5'' = +1.481$ | $d_3'' = .560$ | | $n_3'' = 1.620$ | $\nu_3'' = 60.3$ | C.A.$_5''$ = 1.641 |
| | $r_6'' = -2.185$ | $d_4'' = .101$ | | $n_4'' = 1.720$ | $\nu_4'' = 29.3$ | C.A.$_6''$ = 1.546 |
| | $r_7'' = +13.908$ | | | | | C.A.$_7''$ = 1.424 |
| | | | $l_3'' = .008$ | | | |
| $L_6''$-$L_7''$ | $r_8'' = +1.260$ | $d_5'' = .460$ | | $n_5'' = 1.620$ | $\nu_5'' = 60.3$ | C.A.$_8''$ = 1.297 |
| | $r_9'' = -1.435$ | $d_6'' = .078$ | | $n_6'' = 1.720$ | $\nu_6'' = 29.3$ | C.A.$_9''$ = 1.150 |
| | $r_{10}'' = +4.567$ | | | | | C.A.$_{10}''$ = .978 |

$F = -2.722F = l''_1 = l''_1$, $f_3 = 2.385F$, $f_{4,5} = 2.969F$, $f_{6,7} = 3.332F$.

The Lens Data Table is based on an eyepiece focal length F equal to one inch. The eyepiece was designed to provide an apparent field coverage of about 70 degrees and to furnish a large space between the field lens and the reticle.

It will be recognized, of course, that the characteristics and relationship of the lens as set forth in the figures and accompanying specification are exemplary only, and that the various values of radius, lens thickness, type of glass and the like might be changed considerably and still fall within the scope of our invention.

We claim:

1. A precision eyepiece comprising, from front to rear, a reticular lens, a plano-convex singlet field lens convex to the rear, a cemented doublet center lens and a cemented doublet eye lens conforming substantially to the following table in which dimensions are in terms of inches, and proceeding from front to rear $L_1$ to $L_7$ designate the lenses, $r_0$ to $r_{10}$ the radii of curvature of the surfaces, $d_0$ to $d_6$ the axial thicknesses $l_1$ to $l_3$ the axial separations, $n_0$ to $n_6$ the indices of refraction, $v_0$ to $v_6$ the Abbe dispersion numbers and C.A.$_0$ to C.A.$_{10}$ the clear apertures:

LENS DATA TABLE

|  |  |  |  | $n_d$ | $v$ | C.A. |
|---|---|---|---|---|---|---|
| $L_1$-$L_2$ | $r_0 = -3.183$<br>$r_1 = \pm\infty$<br>$r_2 = +3.183$ | $d_0 = .080$<br>$d_1 = .080$ |  | $n_0 = 1.5838$<br>$n_1 = 1.5838$ | $v_0 = 46.0$<br>$v_1 = 46.0$ | C.A.$_0$ = 1.245<br>C.A.$_1$ = 1.245<br>C.A.$_2$ = 1.245 |
| $L_3$ | $r_3 = \pm\infty$<br>$r_4 = -1.481$ | $d_2 = .386$ | $l_1 = .674$<br>$l_2 = .008$ | $n_2 = 1.620$ | $v_2 = 60.3$ | C.A.$_3$ = 1.651<br>C.A.$_4$ = 1.703 |
| $L_4$-$L_5$ | $r_5 = +1.481$<br>$r_6 = -2.185$<br>$r_7 = +13.908$ | $d_3 = .560$<br>$d_4 = .101$ | $l_3 = .008$ | $n_3 = 1.620$<br>$n_4 = 1.720$ | $v_3 = 60.3$<br>$v_4 = 29.3$ | C.A.$_5$ = 1.641<br>C.A.$_6$ = 1.546<br>C.A.$_7$ = 1.424 |
| $L_6$-$L_7$ | $r_8 = +1.260$<br>$r_9 = -1.435$<br>$r_{10} = +4.567$ | $d_5 = .460$<br>$d_6 = .078$ |  | $n_5 = 1.620$<br>$n_6 = 1.720$ | $v_5 = 60.3$<br>$v_6 = 29.3$ | C.A.$_8$ = 1.546<br>C.A.$_9$ = 1.424<br>C.A.$_{10}$ = .978 |

Equivalent focal length, F=1.000

2. A precision eyepiece comprising, from front to rear, a reticular lens, a plano-convex singlet field lens convex to the rear, a cemented doublet center lens and a cemented doublet eye lens conforming substantially to the following table in which dimensions are in terms of inches, and proceeding from front to rear $L_1'$ to $L_7'$ designate the lenses $r_1'$ to $r_{10}'$ the radii of curvature of the surfaces, $d_1'$ to $d_6'$ the axial thicknesses, $l_1'$ to $l_3'$ the axial separations $n_1'$ to $n_6'$ the indices of refraction, $v_1'$ to $v_6'$ the Abbe dispersion numbers and C.A.$_1'$ to C.A.$_{10}'$ the clear apertures:

3. A precision eyepiece comprising, from front to rear, a reticular lens, a plano-convex singlet field lens convex to the rear, a cemented doublet center lens and a cemented doublet eye lens conforming substantially to the following table in which dimensions are in terms of inches, and proceeding from front to rear $L_1''$ to $L_7''$ designate the lenses, $r_1''$ to $r_{10}''$ the radii of curvature of the surfaces, $d_1''$ to $d_6''$ the axial thicknesses, $l_1''$ to $l_3''$ the axial separations, $n_1''$ to $n_6''$ the indices of refraction, $v_1''$ to $v_6''$ the Abbe dispersion numbers and C.A.$_1''$ to C.A.$_{10}''$ the clear apertures:

LENS DATA TABLE

|  |  |  |  | $n_d$ | $v$ | C.A. |
|---|---|---|---|---|---|---|
| $L_{1,2}''$ | $r_1'' = -1.591$<br>$r_2'' = \pm\infty$ | $d_1'' = .089$ |  | $n_1'' = 1.5838$ | $v_1'' = 46.0$ | C.A.$_1''$ = 1.245<br>C.A.$_2''$ = 1.245 |
| $L_3''$ | $r_3'' = \pm\infty$<br>$r_4'' = -1.481$ | $d_2'' = .386$ | $l_1'' = .725$<br>$l_2'' = .008$ | $n_2'' = 1.620$ | $v_2'' = 60.3$ | C.A.$_3''$ = 1.651<br>C.A.$_4''$ = 1.703 |
| $L_4''$-$L_6''$ | $r_5'' = +1.481$<br>$r_6'' = -2.185$<br>$r_7'' = +13.908$ | $d_3'' = .560$<br>$d_4'' = .101$ | $l_3'' = .008$ | $n_3'' = 1.620$<br>$n_4'' = 1.720$ | $v_3'' = 60.3$<br>$v_4'' = 29.3$ | C.A.$_5''$ = 1.641<br>C.A.$_6''$ = 1.546<br>C.A.$_7''$ = 1.424 |
| $L_6''$-$L_7''$ | $r_8'' = +1.260$<br>$r_9'' = -1.435$<br>$r_{10}'' = +4.567$ | $d_5'' = .460$<br>$d_6'' = .078$ |  | $n_5'' = 1.620$<br>$n_6'' = 1.720$ | $v_5'' = 60.3$<br>$v_6'' = 29.3$ | C.A.$_8''$ = 1.297<br>C.A.$_9''$ = 1.150<br>C.A.$_{10}''$ = .978 |

LENS DATA TABLE

|  |  |  |  | $n_d$ | $v$ | C.A. |
|---|---|---|---|---|---|---|
| $L_{1,2}'$ | $r_1' = \pm\infty$<br>$r_2' = +1.591$ | $d_1' = .089$ |  | $n_1' = 1.5838$ | $v_1' = 46.0$ | C.A.$_1'$ = 1.245<br>C.A.$_2'$ = 1.245 |
| $L_3'$ | $r_3' = \pm\infty$<br>$r_4' = -1.481$ | $d_2' = .386$ | $l_1' = .670$<br>$l_2' = .008$ | $n_2' = 1.620$ | $v_2' = 60.3$ | C.A.$_3'$ = 1.651<br>C.A.$_4'$ = 1.703 |
| $L_4'$-$L_5'$ | $r_5' = +1.481$<br>$r_6' = -2.185$<br>$r_7' = +13.908$ | $d_3' = .560$<br>$d_4' = .101$ | $l_3' = .008$ | $n_3' = 1.620$<br>$n_4' = 1.720$ | $v_3' = 60.3$<br>$v_4' = 29.3$ | C.A.$_5'$ = 1.641<br>C.A.$_6'$ = 1.546<br>C.A.$_7'$ = 1.424 |
| $L_6'$-$L_7'$ | $r_8' = +1.260$<br>$r_9' = -1.435$<br>$r_{10}' = +4.567$ | $d_5' = .460$<br>$d_6' = .078$ |  | $n_5' = 1.620$<br>$n_6' = 1.720$ | $v_5' = 60.3$<br>$v_6' = 29.3$ | C.A.$_8'$ = 1.297<br>C.A.$_9'$ = 1.150<br>C.A.$_{10}'$ = .978 |

No references cited.

DAVID H. RUBIN, *Primary Examiner.*

JOHN K. CORBIN, *Examiner.*